Dec. 2 1952     E. W. SWENSON     2,620,094
MATERIAL SPREADER
Filed March 28, 1949     2 SHEETS—SHEET 1
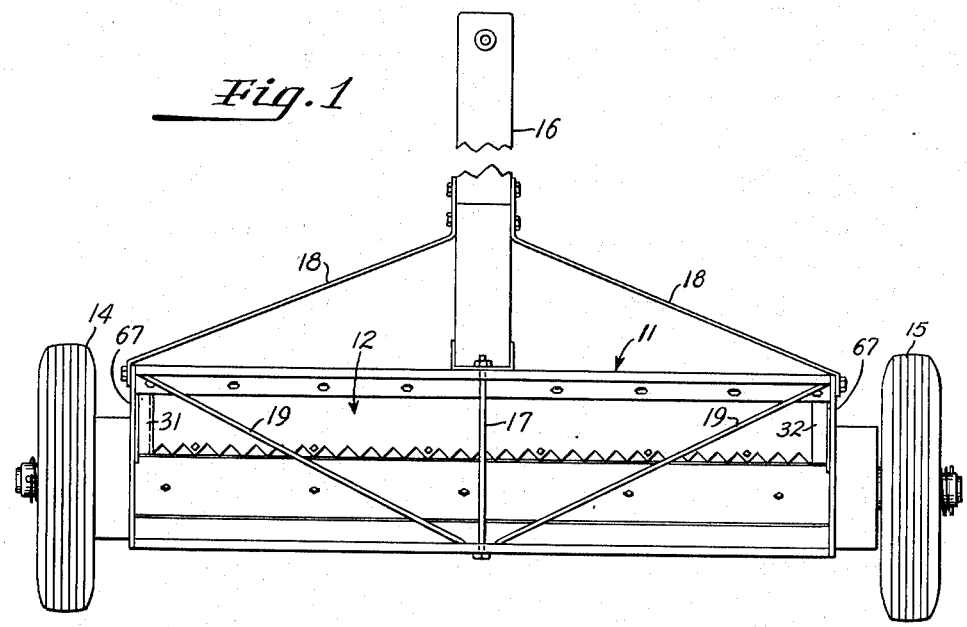
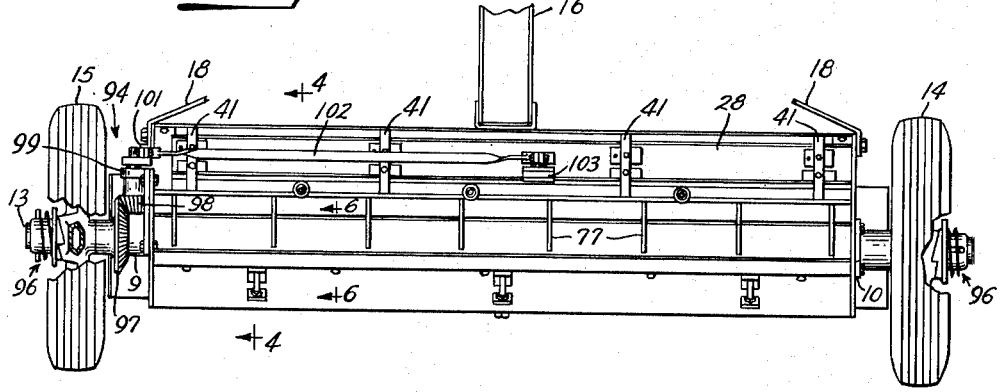
INVENTOR.
Eskil W. Swenson
BY
McCanna and Morsbach
ATTYS.

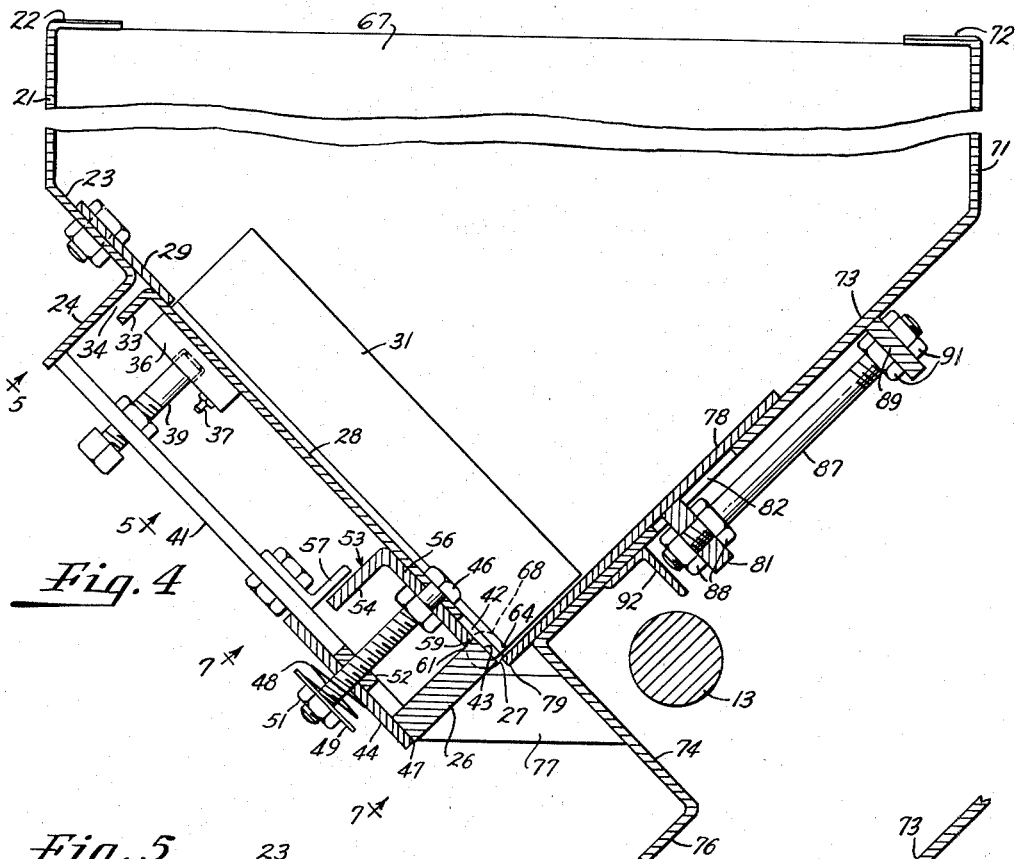
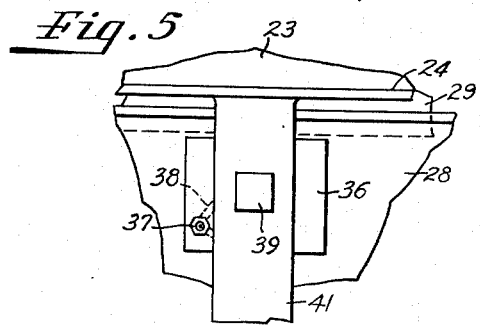
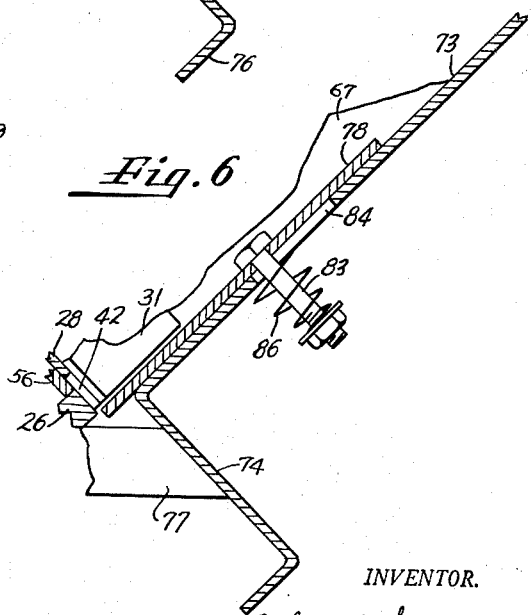
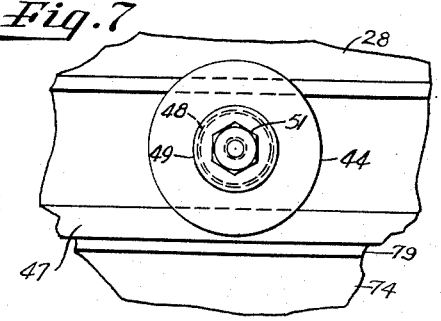

Patented Dec. 2, 1952

2,620,094

UNITED STATES PATENT OFFICE 2,620,094

MATERIAL SPREADER

Eskil W. Swenson, Cherry Valley, Ill.

Application March 28, 1949, Serial No. 83,823

8 Claims. (Cl. 222—177)

This invention relates to material spreaders and more particularly to spreaders suited particularly for spreading commercial fertilizers including those of highly concentrated form.

Heretofore spreaders for commercial fertilizers have not been entirely satisfactory. The tendency in recent years has been to make commercial fertilizers more and more concentrated in the essential elements, to produce the material in more soluble form and to employ lighter but more frequent applications thereof to the soil. All of these have called for more accurate distribution in small amounts and has increased the difficulty of proper distribution. For example with certain types of fertilizer it is common to distribute, in powdered form, as low as twenty pounds of material per acre which must be distributed uniformly over the area to be covered. This calls for extreme accuracy and uniformity of operation in the distributing device. In addition the distributor must also be capable of handling other types of fertilizer which may sometimes be distributed at the rate of several tons to the acre. Some commercial fertilizers, normally sold in sealed containers, upon exposure to the atmosphere absorb sufficient moisture to become pasty or soggy after a short period of time. As a result the distributing or feeding mechanism tends to clog up with such material. Too, it frequently happens that the moisture condition of the fertilizer, the shape of the hopper, and disposition of the feeding mechanism in present designs, are such that the fertilizer bridges in the hopper and does not feed to the feeding mechanism properly and consequently is not spread over the ground uniformly. These requirements are so severe that I am not aware of a single machine on the market other than that herein described which is capable of satisfactorily meeting these requirements.

An important object of the invention is the provision of a spreader of the above character for fertilizer and the like having novel feed means for positively feeding material in a substantially uniform manner from a hopper capable of maintaining substantial uniformity of distribution of material through a substantially greater variation in moisture conditions than has heretofore been possible.

Another object of the invention is the provision of a spreader of the above character in which bridging of the material in the hopper and clogging of the parts is eliminated.

Another object of the invention is the provision of a spreader capable of distributing powdered material at a relatively low rate and with substantially greater accuracy and uniformity than has heretofore been possible.

Another object of the invention is the provision of a spreader having novel means for controlling the feed rate of the material from the exterior of the hopper whereby the exact quantity of material dispensed may be readily and accurately controlled.

Another object of the invention is to provide a spreader of the above character comprising a hopper having a feed slot and a feed mechanism including a reciprocating feed plate overlying the slot to force material therethrough with a novel drive means for driving the feed plate.

Other objects and advantages of the invention will become apparent from the following detailed description taken in connection with the accompanying drawings, in which—

Figure 1 is a top plan view of a fertilizer spreader embodying the present invention;

Fig. 2 is a bottom view of the spreader;

Fig. 3 is a fragmentary perspective view looking downwardly and toward one end of the hopper showing one position of the feed plate in the hopper and an opening in the end wall for the passage of material engaged by the extreme end of the feed plate during the latter's reciprocation;

Fig. 4 is a sectional view taken along a line 4—4 of Fig. 2;

Fig. 5 is an enlarged sectional view taken substantially along the line 5—5 of Fig. 4;

Fig. 6 is a sectional view taken substantially along the line 6—6 of Fig. 2; and Fig. 7 is a fragmentary sectional view taken substantially along the line 7—7 of Fig. 4.

The invention is shown embodied in a spreader for commercial fertilizer, lime and the like of the type adapted to be drawn behind a tractor or similar drafting unit. The spreader includes a hopper 11 for holding fertilizer and means, designated generally by the numeral 12, for feeding the fertilizer uniformly from the hopper 11. The hopper is mounted by suitable bearing brackets 9 and 10 at opposite ends of the hopper and an intermediate bracket, not shown, on a rotatable shaft 13, supported at opposite ends by wheels 14 and 15. A tongue 16 for attaching the spreader to the tractor is rigidly attached to the front of the hopper intermediate its ends in a conventional manner as by bolts 17 (only one being shown in Figure 1) extending transversely of the hopper 11. Suitable braces 18 between opposite ends of the hopper 11 and the tongue 16 and braces 19 in the hopper between the front and back of the hopper are provided for strengthening and reinforcing purposes.

As shown in Fig. 4 the front of the hopper includes a vertical portion 21. At its upper edge is a strengthening flange 22 facing inwardly of the hopper 11. Inclined rearwardly from the bottom of the vertical portion 21 is a section 23 terminating in a forwardly extending flange 24 at substantially right angles to the section 23. Spaced downwardly at some distance from the flange 24 at the bottom of the hopper is a feed bar 26 in parallelism with the flange 24 and defining an edge of a feed slot 27. A reciprocably mounted feed plate 28 is disposed in the space or opening between the flange 24 and the feed bar 26. The feed plate 28 extends lengthwise of the hopper from end to end and forms a substantial part of the front of the hopper. A guide plate 29 on the interior of the hopper is mounted on the inclined section 23 as by bolts to overlap the upper edge portion of the feed plate 28 and guide plates 31 and 32 (see Figure 1) are secured to the ends of the hopper to overlap the extreme ends of the feed plate 28 in both extreme positions of the latter. The plate 28 terminates in an outwardly projecting flange 33 on its upper edge in spaced relation to the flange 24 and defines therewith a relatively wide passageway 34 extending lengthwise of the hopper.

Spaced pads 36 engage the feed plate 28 adjacent the flange 33 and define bearing surfaces for the upper part of the feed plate 28. Preferably each pad is provided with a lubricant fitting 37 in communication with passageways 38 formed in the pad and opening on to the surface abutting against the feed plate 28, for lubrication purposes. Each pad is mounted on the end of a bolt 39. Each bolt 39 extends through a strap 41, the opposite ends of which are rigidly attached as by welding to the flange 24 and the feed bar 26. As best seen in Fig. 2 the straps are spaced lengthwise of the hopper. While four straps 41 are shown in this embodiment of this invention it is to be understood that the number will vary according to the length of the hopper.

On its bottom edge the feed plate 28 is formed with downwardly extending teeth 42. The latter rest on a smooth inclined surface 43 of the feed bar 26 and are in closely spaced overlying relation with the feed slot 27. Washers 44 mounted respectively on rigid bolts 46 extending through the feed plate 28 engage a face 47, on the feed bar 26, in parallelism with the face 43, to secure the feed plate 28 in the aforegoing position. Springs 48 are disposed respectively between washers 49, held on the end of the bolts 46 by nuts 51, and the washers 44. Normally lower springs 48 and washers 44 are held in a position by lock nuts 52 such that the teeth 42 freely rest on the surface 43 but the least displacement of movement of the teeth 42 away from the surface 43 biases the springs 48 so that they resist this movement.

As shown in Fig. 3 there is a relatively wide included angle between adjacent teeth 42 and they terminate respectively in pointed edges spaced upwardly from the bottom edge of the surface 43 of the feed bar 26. The base portions of the teeth overlie a leg portion 56 of a bracket 53 mounted on the outer side of the feed plate 28 and the extreme ends 64 of the teeth project beyond the leg portion 56 to rest on the surface 43. As will be apparent to those skilled in the art the teeth 42 may have many different shapes. Preferably the end portions of the teeth resting on the feed bar 26 are spaced sufficiently far apart so that material in the bottom of the hopper is urged between the teeth. The sides 66 (see Fig. 3) of the teeth 42 have a gradual inclination from the bottom of the valleys between adjacent teeth to the pointed ends of each respective tooth. The teeth are formed of relatively heavy gauge material so that the sides 66 defining the teeth 42 have an appreciable thickness. Thus, each side 66 forms a downwardly inclined cam surface overlying the feed slot 27. The leg portion 56 bridges the spaces 63 between adjacent teeth. The spaces 63 between the bases of adjacent teeth and the leg portion 56 thus define a construction having a roughened or corrugated surface facing inwardly of the hopper 11, spaced upwardly from the ends 64 of the teeth.

The bracket 53 is also formed with an arm 54. The arm 54 extends outwardly from the feed plate 28 at substantially right angles thereto and is shaped to engage spaced fixed brackets 57 to limit upward movement of the feed plate 28. One bracket 57 is secured on each strap 41 as by bolts extending therethrough. The leg portion 56 is positioned so that its bottom edge 59 is shaped to engage a side 61 of the feed bar 26 adjacent the surface 43. The outer facing side of the feed plate 28 and the bottom edge 59 of the leg portion 56 in effect define a groove shaped to slidably receive a guide defined by the surface 43 and the surface 61 on the feed bar 26.

The ends of the hopper as best seen in Figure 1 are in the form of vertically disposed end walls 67. Each of the ends 67 is formed with an aperture 68 positioned adjacent the ends of the feed slot 27 to be in alinement with the end teeth 42 of the feed plate 28.

The back of the hopper 11 includes a vertical portion 71 spaced rearwardly from the vertical portion 21 of the front of the hopper. A flange 72 at the top of the vertical portion 71 extends inwardly of the hopper for strengthening purposes. A portion 73 is inclined forwardly from the bottom of the vertical portion 71 and terminates in a flange 74 adjacent the feed slot 27 at substantially right angles to the inclined portion 73. At its outer edge the flange 74 is bent forwardly as shown in Fig. 4 to define a strengthening rib 76. To increase the rigidity of the hopper structure spaced ribs 77 below the feed slot 27 are rigid with the flange 74 and the feed bar 26. A slide plate 78 rests on top of the inclined portion or wall 73 and terminates in an edge 79 that defines the opposite edge of the feed slot 27. The slide plate 78 (see Figs. 4 and 6) is movable between an open position which defines the feed slot 27 and a position in which the lower edge 79 rests on the surface 43 below the ends 64 of the teeth 42 to completely close the slot 27. The slide plate 78 is held in side by side relation with the inclined wall by bolts 83. The latter extend respectively through the slide plate 78 and through elongated apertures 84 formed in the inclined wall 73. A spring 86 acting between the bolt 83 and the inclined wall 73 biases the slide plate 78 into a tight side by side relation with the inclined wall 73. The slide plate 78 is formed with outwardly projecting bosses 81 extending through elongated apertures 82 respectively in the inclined wall 73. Adjustment bolts 87 project through the bosses 81 and are interlocked therewith by lock nuts 88 abutting against opposite sides of each boss 81. The opposite end of each bolt 87 projects through an opening in a bracket 89, one bracket being provided for each bolt. Each bracket is rigid with the inclined wall 73 and projects outwardly therefrom at a distance spaced upwardly from the boss 81. Lock nuts 91 in engagement with opposite sides of the bracket 89 secure the bolt 87 in a desired adjusted position. The width of the feed slot 27 may be adjusted by varying the position of the lock nuts 91 on the bolts 87. A bracket 92 rigid with the exterior surface of the inclined wall 73 is in spaced axial alinement with the lower ends of each bolt 87. The distance between the end of each bolt 87 and the bracket 92 indicates the position of the slide plate 78 with respect to the feed bar 26 and in turn the width of the slot 27. Preferably a conventional thickness gauge is disposed between the ends of the bolts 87 and the brackets 92 to determine the width of the feed slot 27. If calibrations are desired on the inclined walls 73 of the hopper or the bolts 87 these may be added so that the width of the slot is given directly in inches or other desired dimensions.

Means is provided for reciprocating the feed plate 28 to positively feed fertilizer uniformly through the feed slot 27. As shown in Fig. 2 the feed plate 28 is driven from the wheels 14 and 15 through a suitable power train 94. The latter includes conventional throw-out clutches 96 mounted on the shaft 13 adjacent each wheel 14 and 15, a bevel gear 97 keyed to the shaft 13 adjacent the wheel 14 and a bevel gear 98. The clutches 96 are of the type that may be manually thrown into and out of operative position and when in the operative position permit the power train to be driven when either of the wheels 14 or 15 moves in a forward direction. The gear 98 is keyed to one end of a shaft 99 at right angles to the shaft 13 and projecting forwardly thereof. The shaft 99 is rotatably supported by the bracket 9. A crank 101 is mounted on the opposite end of the shaft 99 for connection to one end of a rigid link 102, the opposite end of which is pivotally connected to a bracket 103 rigidly attached to the outer side of the feed plate 28, intermediate the latter's ends. The connections between the link 102 and the crank 101 and between the link 102 and the bracket 103 are preferably of a resilient construction in order to minimize shock and the like to the moving parts during the reciprocation of the feed plate 28.

The operation of the foregoing construction may be summarized as follows: The position of the feed adjustment plate 78 is adjusted to obtain the desired rate of feed, it being understood that the rate of feed depends upon the fertilizer or material being distributed over a field. The clutches 96 are thrown into their operative positions and the spreader is moved forwardly to cause the shaft 13 to rotate. Upon rotation of the shaft 13 the feed plate 28 is reciprocated through the power train 94. As the teeth 42 move relative to the mass of fertilizer in the hopper material is forced through the feed slot 27. During the feeding process the bottom portion of the mass of fertilizer in the hopper 11 is forced between the teeth by the weight of the top portion of the mass and also due to the jostling of the spreader as it moves over the field. The sides of the teeth 66, which in effect are inclined cam surfaces, move relative to the material between the teeth and cam or force the material therebetween downwardly through the feed slot 27. This is a continuous action so long as fertilizer is in the hopper; that is, the material is constantly urged between the teeth as described above and the teeth are reciprocating; thus a constant flow of fertilizer through the slot 27 is obtained. This positive force feeding of material from the hopper 11 is obtained whether the fertilizer is dry, damp or contains sufficient moisture so that the mass is soggy or pasty.

Since the feed plate 28 forms a substantial portion of the front of the hopper and is inclined, it is apparent that as it reciprocates the mass of material resting on the plate is caused to vibrate and consequently settle downwardly to the bottom of the hopper. Due to the reciprocatory movement of the feed plate it is believed that the mass of material overlying the feed plate is caused to settle downwardly in the hopper along the plate. This continual reciprocatory or vibratory movement is effective in preventing arching or bridging of material in the hopper since it tends to crumble or destroy the support for the arch on the one side of the hopper and consequently the arch cannot form. During the downward movement of the mass of material the roughened or corrugated surface, defined by the bases of adjacent teeth, the spaces 63 between the bases of adjacent teeth and the leg portion 56, engages the fertilizer passing to the feed slot and tends to pulverize and grind lumps or the like formed in the fertilizer. This minimizes the tendency for hard lumps to get between the sides 66 and clog the feed slot 27 thereby preventing the normal passage of material thereto by the teeth 42. The openings 68 in the end walls 67 adjacent the end teeth 42 of the feed plate form passageways for material engaged by these teeth. Build-up of material and the tightly packing of material between the end walls 67 and the ends of the feed plate 28 is thus prevented. As a consequence bridging of material at the ends of the hopper is also prevented. The passageway 34 serves to form an outlet for material getting beneath the upper guide plate 29 and the upper portion of the feed plate 28. The outlet passage 34 is of sufficient width to insure that any material getting under the guide plate 29 can readily drop from the hopper. The teeth 42 rest on the surface 43 and the construction for maintaining the teeth on the surface in engagement with this surface is such that should the teeth 42 be forced away from the surface 43 as by fertilizer getting beneath the teeth the spring 48 is operative to oppose this action and tends to hold the feed plate in a position in which the teeth 42 rest on the surface 43. The action of the spring 48 is such that any material getting under the teeth is squeezed out from beneath the teeth 42 and the feed bar 26. Normally most of the material getting between the teeth 42 and the feed bar passes through the feed slot 27. The mounting of the feed plate 28 however permits a limited upward movement and some material may be squeezed out from beneath the teeth 42 and the feed bar 26 between the surface 59 on the bracket 53 and the surface 61 on the feed bar 26.

This construction is advantageous in that a fertilizer can be positively and accurately fed from the hopper under greatly varying moisture conditions. Test experience shows that the shape of the teeth, the spacing between teeth, mounting of the feed plate 28, biasing action of the spring 48 provide a construction which effects positive feed of material through the feed slot and in which build-up of material, bridging of the hopper and clogging of the parts is eliminated. The mounting of the feed plate 28 and the connection thereof with the link 102 is such that the driving force is applied intermediate the ends of the feed plate 28. This is advantageous since the ends of the feed plate are not urged upwardly by the driving force as would be the case if the feed plate 28 should be driven at the ends and the driving means is out of alinement with the feed plate 28.

I claim:

1. A spreader for fertilizer and the like comprising in combination, a hopper including a back portion and a front portion, one of said portions having a bottom edge intermediate said portions, the other portion including a feed bar in spaced relation to said bottom edge to define therewith a continuous feed slot at one side of the feed bar extending lengthwise of the bottom of the hopper from end to end thereof and having an opening of substantial width extending lengthwise of the hopper at the other side of said feed bar, an elongated relatively wide reciprocably mounted feed plate extending lengthwise of the hopper to span said opening and define a substantial part of the other portion of the hopper and having teeth on its bottom edge resting on said feed bar adjacent said slot, said teeth being spaced apart at their portions overlying the edge of the feed bar remote from said feed slot to permit reception of fertilizer therebetween and being defined by downwardly inclined sides, said sides being of appreciable width and forming cam surfaces in overlying relation with said slot, and means for reciprocating said feed plate to move said cam surfaces relative to the fertilizer between said teeth to positively force it through said slot.

2. A spreader for fertilizer and the like comprising in combination, a hopper including a back portion and a front portion, one of said portions having a lower edge intermediate said portions, the other portion including a feed bar in spaced relation to said lower edge to define therewith a continuous feed slot at one side of the feed bar extending lengthwise of the bottom of the hopper and having an opening at the other side of the feed bar of substantial width extending lengthwise of the hopper adjacent said feed bar, a reciprocably mounted imperforate feed plate spanning said opening to define a substantial part of the other portion of the hopper and having teeth on its lower edge resting on said feed bar adjacent said slot, said teeth being spaced apart at their portions overlying the edge of the feed bar remote from said feed slot to permit reception of fertilizer therebetween and being defined by downwardly inclined sides overlying the feed bar, said sides being of appreciable width and forming cam surfaces in overlying relation with said slot, means for reciprocating said feed plate to move said cam surfaces relative to the fertilizer between said teeth to force it through said slot, means inside said hopper overlying the ends only of said feed plate and forming guides therefor, and means for effecting removal of fertilizer from the hopper engaged by the extreme ends of the feed plate during its reciprocation to prevent build-up of material at the ends of the feed plate.

3. A spreader for fertilizer and the like comprising in combination, a hopper including a back portion and a front portion, one of said portions having a lower edge intermediate said portions, the other portion including a feed bar in spaced relation to said lower edge to define therewith a feed slot at one side of the feed bar extending lengthwise of the bottom of the hopper from end to end thereof and having an opening of substantial width extending lengthwise of the hopper at the other side of said feed bar, a reciprocably mounted relatively wide feed plate spanning said opening to define a substantial part of the other portion of the hopper and having teeth defined by inclined sides on its lower edge resting on said feed bar, said teeth being spaced apart at their portions overlying the edge of the feed bar remote from said feed slot to receive fertilizer therebetween and having their ends in closely spaced overlying relation with said slot, means for reciprocating said feed plate to move said teeth relative to the fertilizer between said teeth to force it through said slot, and means accessible from the exterior of the back portion of the hopper for accurately adjusting the width of said slot to effect a preselected rate of feed.

4. A spreader for fertilizer and the like comprising in combination, a hopper including a back portion and a front portion, one of said portions having a lower edge intermediate said portions, the other portion including a feed bar in spaced relation to said lower edge to define therewith a feed slot at one side of the feed bar extending lengthwise of the bottom of the hopper and having an opening of substantial width extending lengthwise of the hopper at the other side of said feed bar, a reciprocably mounted relatively wide feed plate spanning said opening to define a substantial part of the other portion of the hopper and having teeth with inclined sides on its lower edge resting on said feed bar, said teeth being spaced apart at their portions overlying the edge of the feed bar remote from said feed slot to receive fertilizer therebetween and having their ends in closely spaced overlying relation with said slot, means for reciprocating said feed plate to move said teeth relative to the fertilizer between said teeth to force it through said slot and to move relative to the fertilizer to prevent the latter from bridging, means for adjusting the width of said slot to control the rate of feed, and means accessible from the exterior of the hopper for indicating the slot width.

5. A spreader for fertilizer and the like comprising in combination, a hopper for holding fertilizer including a back portion, a front portion, one of said portions having a lower edge and the other portion having a feed bar in spaced relation to said lower edge to define therewith a feed slot at the lower side of the feed bar extending lengthwise of the bottom of the hopper and having an opening of substantial width extending lengthwise of the hopper at the upper side of said feed bar, and ends interconnecting the front and back portions, said ends each having an aperture in communication with the interior of the hopper and positioned adjacent the ends of the slot and in alinement therewith, a relatively wide reciprocably mounted feed plate spanning said opening to define a substantial part of said other portion of the hopper and having teeth on its lower edge resting on said bar, said teeth being spaced apart at their portions overlying the upper edge of the feed bar to receive fertilizer therebetween and in alinement with said apertures in the end portions, and means for reciprocating said feed plate to move it relative to the fertilizer in the hopper to agitate the latter to prevent bridging thereof in the hopper and to move said teeth relative to the fertilizer between said teeth and feed it through said slot and to move the fertilizer engaged by the extreme ends of the feed plate through said apertures in the ends whereby to prevent build-up of material at the ends of the hopper.

6. A spreader for a fertilizer and the like comprising in combination, a hopper including a back portion and a front portion, one of said portions terminating in a feed bar and having an elongated opening of substantial width disposed upwardly from the upper side of the feed bar, the other portion having a lower edge spaced from the lower side of said feed bar to define therewith an elongated feed slot extending lengthwise of the bottom of the hopper, said feed bar having first and second smooth surfaces at its upper side at right angles to each other extending downward respectively toward and away from said feed slot, a reciprocably mounted feed plate spanning said opening to define a substantial part of the other portion of the hopper and having teeth on its lower edge spaced apart at the upper edge of said feed bar forming the juncture between said smooth surfaces thereon to receive material therebetween, the end portions of said teeth resting on said smooth surface on the feed bar which extends downward toward the feed slot in overlying relation to said slot, means mounted on the exterior surface of the feed plate extending below the teeth thereon to bridge the spaces between the bases of adjacent teeth to define with said bases a corrugated surface facing inwardly of the hopper for pulverizing lumps in the hopper passing to the slot and abutting against the other smooth surface on the feed bar which extends downward away from the feed slot to form a guide and positioning means for said feed plate, and means for reciprocating said feed plate to move said teeth relative to the fertilizer between said teeth to positively force it through said slot.

7. The apparatus of claim 6, wherein there is provided means resiliently biasing the feed plate to position said teeth thereon in engagement with the feed bar.

8. In a fertilizer spreader, the combination of a hopper for a fertilizer having end walls, front and back walls including lower front and back portions connected thereto, said lower front and back portions being inclined and spaced apart at their extreme lower edges to define a slot at the bottom of the hopper, the front portion being substantially defined by a reciprocably mounted feed plate having downwardly facing teeth on its lower edge closely overlying said slot, rigid means forming a part of said front portion defining a support for the feed plate adjacent its teeth, means engageable with the feed plate at positions spaced from the teeth to define bearings for the feed plate, means for supporting said bearings, guide means acting between the upper portion, the lower portion, and the ends of the feed plate and the hopper to positively position and guide the feed plate, and means for reciprocating the latter to feed fertilizer through said slot at a preselected rate, said front wall having an outwardly extending flange and the upper edge of the feed plate terminating in an outwardly extending flange in spaced substantially parallel relation with the flange on the front wall to define an outlet passageway for material getting between the guide means at the upper edge of the feed plate and the feed plate.

ESKIL W. SWENSON.

REFERENCES CITED

The following references are of record in the file of this patent:

UNITED STATES PATENTS

| Number | Name | Date |
| --- | --- | --- |
| 18,774 | Seymour | Dec. 1, 1857 |
| 76,621 | Foster | Apr. 14, 1868 |
| 971,917 | Mitchell | Oct. 4, 1910 |
| 990,395 | Searle | Apr. 25, 1911 |
| 1,968,513 | Berg | July 31, 1934 |

FOREIGN PATENTS

| Number | Country | Date |
| --- | --- | --- |
| 41,737 | Denmark | Mar. 3, 1930 |
| 50,223 | Netherlands | Apr. 15, 1941 |
| 85,068 | Germany | Jan. 28, 1896 |
| 623,169 | Great Britain | May 12, 1949 |